US011675965B2

(12) United States Patent
Yin et al.

(10) Patent No.: US 11,675,965 B2
(45) Date of Patent: Jun. 13, 2023

(54) CONVERTING TEXT TO A NUMERICAL VECTOR BY MAPPING TO A HYPERCUBE

(71) Applicant: AT&T Intellectual Property I, L.P., Atlanta, GA (US)

(72) Inventors: Changchuan Yin, Hoffman Estates, IL (US); Sachin Lohe, Allen, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/225,041

(22) Filed: Apr. 7, 2021

(65) Prior Publication Data

US 2022/0327278 A1   Oct. 13, 2022

(51) Int. Cl.
*G06F 40/126* (2020.01)
*G06F 40/123* (2020.01)

(52) U.S. Cl.
CPC .......... *G06F 40/126* (2020.01); *G06F 40/123* (2020.01)

(58) Field of Classification Search
CPC ...... G06F 40/126; G06F 40/10; G06F 40/123; G06F 16/2237
See application file for complete search history.

(56) References Cited

U.S. PATENT DOCUMENTS

| | | | | |
|---|---|---|---|---|
| 2015/0378674 A1* | 12/2015 | Ruff | ......................... | H03M 7/06 708/204 |
| 2017/0372071 A1* | 12/2017 | Saxe | ......................... | G06N 3/08 |
| 2018/0203852 A1* | 7/2018 | Goyal | ..................... | G06N 3/006 |
| 2018/0248739 A1* | 8/2018 | Fang | .................. | H04B 1/71055 |
| 2018/0322386 A1* | 11/2018 | Sridharan | ................. | G06F 9/54 |
| 2019/0332610 A1* | 10/2019 | Krishna | ............... | G06F 16/2457 |
| 2019/0377797 A1* | 12/2019 | Liu | .......... | G06F 40/30 |
| 2020/0104746 A1* | 4/2020 | Strope | ...................... | G06N 5/04 |
| 2020/0328886 A1* | 10/2020 | Newton | ................ | H04L 9/0858 |
| 2021/0295822 A1* | 9/2021 | Tomkins | .................. | G06N 3/04 |
| 2021/0406283 A1* | 12/2021 | Chatbri | ............... | G06F 16/2456 |

OTHER PUBLICATIONS

Devlin, J., Chang, M.-W., Lee, K., Toutanova, K., 2018. Bert: Pre-training of deep bidirectional transformers for language understanding. arXiv preprint arXiv:1810.04805.

Harary, F., Hayes, J. P., Wu, H.-J., 1988. A survey of the theory of hypercube graphs. Computers & Mathematics with Applications 15 (4), 277-289.

(Continued)

*Primary Examiner* — Ariel Mercado (57) ABSTRACT

An example method is provided for encoding text for language processing. The method may be executed by a processing system, and the method includes receiving text comprising a plurality of alphanumeric characters or symbols and converting the text into a numerical vector comprising a plurality of numerical values, by mapping each alphanumeric character or symbol of the text to a vertex coordinate of one of a plurality of vertices of a hypercube, wherein a number of the plurality of vertices is equal to or greater than a number of the plurality of alphanumeric characters or symbols, wherein the numerical vector consumes less space in memory than the text. An amount of time consumed by language processing of the numerical vector may be less than an amount of time consumed by language processing of the text.

20 Claims, 6 Drawing Sheets

(56) References Cited

OTHER PUBLICATIONS

Mikolov, T., Chen, K., Corrado, G., Dean, J., 2013. Efficient estimation of word representations in vector space. arXiv preprint arXiv:1301.3781.
Pennington, J., Socher, R., Manning, C. D., 2014. Glove: Global vectors for word representation. In: Proceedings of the 2014 conference on empirical methods in natural language processing (EMNLP). pp. 1532-1543.

* cited by examiner

| CHARACTER | VERTEX COORDINATE |
|---|---|
| A | [1 -1 -1 -1 -1 -1 1 -1] |
| B | [-1 1 -1 -1 -1 -1 1 -1] |
| C | [1 1 -1 -1 -1 -1 1 -1] |
| D | [-1 -1 1 -1 -1 -1 1 -1] |
| E | [1 -1 1 -1 -1 -1 1 -1] |
| F | [-1 1 1 -1 -1 -1 1 -1] |
| G | [1 1 1 -1 -1 -1 1 -1] |
| H | [-1 -1 -1 1 -1 -1 1 -1] |
| I | [1 -1 -1 1 -1 -1 1 -1] |
| J | [-1 1 -1 1 -1 -1 1 -1] |
| K | [1 1 -1 1 -1 -1 1 -1] |
| L | [-1 -1 1 1 -1 -1 1 -1] |
| M | [1 -1 1 1 -1 -1 1 -1] |
| N | [-1 1 1 1 -1 -1 1 -1] |
| O | [1 1 1 1 -1 -1 1 -1] |
| P | [-1 -1 -1 -1 1 -1 1 -1] |
| Q | [1 -1 -1 -1 1 -1 1 -1] |
| R | [-1 1 -1 -1 1 -1 1 -1] |
| S | [1 1 -1 -1 1 -1 1 -1] |
| T | [-1 -1 1 -1 1 -1 1 -1] |
| U | [1 -1 1 -1 1 -1 1 -1] |
| V | [-1 1 1 -1 1 -1 1 -1] |
| W | [1 1 1 -1 1 -1 1 -1] |
| X | [-1 -1 -1 1 1 -1 1 -1] |
| Y | [1 -1 -1 1 1 -1 1 -1] |
| Z | [-1 1 -1 1 1 -1 1 -1] |
| 0 | [1 1 1 1 1 1 1 1] |
| 1 | [1 1 1 1 1 1 1 -1] |
| 2 | [1 1 1 1 1 1 -1 -1] |
| 3 | [1 1 1 1 1 -1 -1 -1] |
| 4 | [1 1 1 1 -1 -1 -1 -1] |
| 5 | [1 1 1 -1 -1 -1 -1 -1] |
| 6 | [1 1 -1 -1 -1 -1 -1 -1] |
| 7 | [1 -1 -1 -1 -1 -1 -1 -1] |
| 8 | [-1 -1 -1 -1 -1 -1 -1 -1] |
| 9 | [-1 -1 -1 -1 -1 -1 -1 1] |
| ! | [-1 -1 -1 -1 -1 -1 1 1] |
| @ | [-1 -1 -1 -1 -1 1 1 1] |
| # | [-1 -1 -1 -1 1 1 1 1] |
| $ | [-1 -1 -1 1 1 1 1 1] |
| % | [-1 -1 1 1 1 1 1 1] |

CONVERTING TEXT TO A NUMERICAL VECTOR BY MAPPING TO A HYPERCUBE

The present disclosure relates generally to natural language processing (NLP), and relates more particularly to an apparatus, method, and non-transitory computer readable medium for hypercube encoding of text for natural language processing.

BACKGROUND

Natural language processing (NLP) can be used for a variety of different applications. NLP can be used by machines to understand language and process the language for machine translation or sentiment analysis. Machines can have difficulty analyzing regular text to detect patterns.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

The present disclosure broadly discloses a method, non-transitory computer readable medium, and apparatus for encoding text. In one example, a method performed by a processing system includes receiving text to be encoded, applying a hypercube encoding to the text, generating a numerical vector in accordance with the hypercube encoding that represents the text, and storing the numerical vector.

In another example, a non-transitory computer-readable medium may store instructions which, when executed by a processing system in a communications network, cause the processing system to perform operations. The operations may include receiving text to be encoded, applying a hypercube encoding to the text, generating a numerical vector in accordance with the hypercube encoding that represents the text, and storing the numerical vector.

In another example, a device may include a processing system including at least one processor and non-transitory computer-readable medium storing instructions which, when executed by the processing system when deployed in a communications network, cause the processing system to perform operations. The operations may include receiving text to be encoded, applying a hypercube encoding to the text, generating a numerical vector in accordance with the hypercube encoding that represents the text, and storing the numerical vector.

As discussed above, NLP can be used for a variety of different applications. NLP can be used by machines to understand language, e.g., spoken language and process the language for machine translation or sentiment analysis. In some situations, machines can have difficulty analyzing regular text to detect patterns. For various NLP methods, the methods may attempt to embed or transform text into numbers or a sequence of numbers.

Some available methods may include One-Hot encoding, Word2Vec encoding, GloVe encoding, and the like. However, these methods may require machine learning, neural networks, a large corpus of training data, a storage of all possible words in a dictionary, and the like. Thus, these methods can be computationally expensive, time consuming, and/or inefficient.

Examples of the present disclosure may provide a method that uses hypercube encoding/decoding. The hypercube encoding may transform text from words or phrases into a numerical vector. The size of the numerical vector may depend on a size of the hypercube that is selected to map a defined set of alphanumeric characters and/or symbols. The numerical vector may provide lossless compression that may reduce an amount memory that is consumed to store text, reduce the amount of bandwidth or increase the rate of transmission to transmit text, improve the efficiency of machine learning algorithms to analyze the text, and so forth. These and other aspects of the present disclosure are discussed in greater detail below in connection with the examples of FIGS. 1-6.

Figure 1:
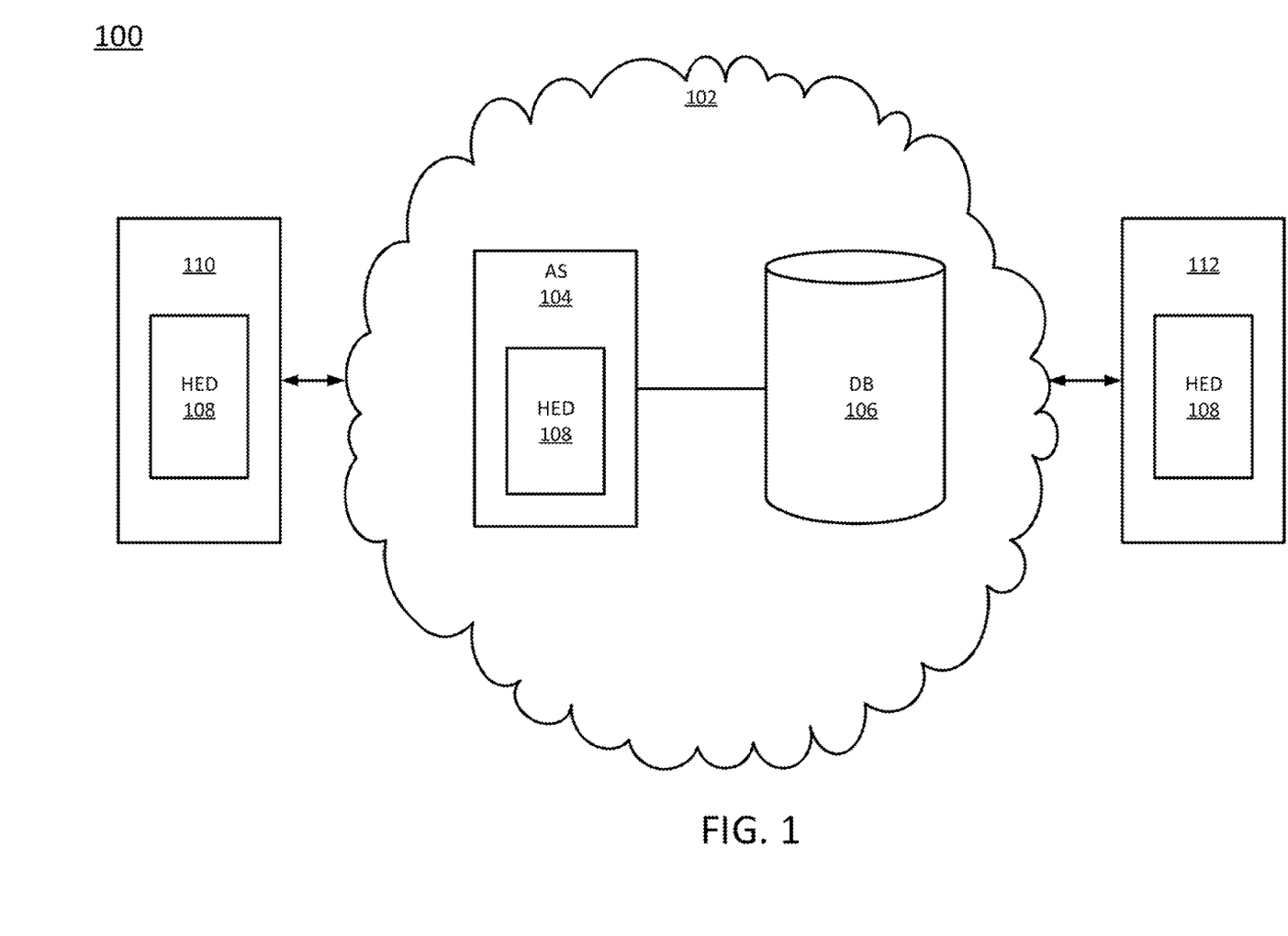
FIG. 1 illustrates an example network that uses a hypercube encoder/decoder of the present disclosure.

To better understand the present disclosure, FIG. 1 illustrates an example network 100, related to the present disclosure. As shown in FIG. 1, the network 100 may include a core network 102. The core network 102 may be a service provider network that may provide communication services and content services (e.g., streaming media, Internet television, and the like).

In one embodiment, the core network 102 may include an application server (AS) 104 and a database (DB) 106. The AS 104 may comprise a processing system (e.g., a processor and a memory storing instructions) that may execute the functions described herein. The AS 104 may be communicatively coupled to the DB 106. The DB 106 may store various information and/or data. For example, the DB 106 may store a table of alphanumeric characters and/or symbols to vertices of a hypercube for hypercube encoding and decoding, as described in further details below. The DB 106 may also store numerical vectors that represent text that are generated from hypercube encoding/decoding. The DB 106 may store instructions that are executed by the processor of the AS 104 to perform functions as described herein. For example, the instructions may be to execute a hypercube encoder/decoder (HED) 108 controlled by the AS 104.

In one embodiment, the network 100 may include an endpoint device 110 and an endpoint device 112. The endpoint devices 110 and 112 may be any type of endpoint device. For example, the endpoint devices 110 and 112 may be a laptop computer, a desktop computer, a mobile telephone, a tablet computer, a smart appliance, a set top box, and the like. Although two endpoint devices 110 and 112 are illustrated in FIG. 1, it should be noted that any number of endpoint device 110 and 112 may be deployed in the network 100.

In one embodiment, the endpoint device 110 and 112 may be communicatively coupled to the network 102. The endpoint device 110 and 112 may transmit data across the network 102 to and from the AS 104 and/or to and from the endpoint devices 110 and 112. The endpoint devices 110 and 112 may transmit and receive text for a variety of different applications.

In one embodiment, the endpoint devices 110 and 112 may also include a HED 108. Thus, the hypercube encoding and decoding, as described in the present disclosure, may be performed by any endpoint device 110 or 112 or the AS 104 in the core network 102. The HED 108 may encode text into a numerical vector or decode the numerical vector back into the original text. Encoding the text into a numerical vector my allow the text to be compressed to reduce the amount of memory consumed for storage and reduce the amount of bandwidth consumed for transmission.

In addition, encoding the text into a numerical vector may allow computing devices and processors to quickly analyze text and generate meaningful outputs. For example, the numerical vector may be mathematical compared to other numerical vectors that represent other text. The numerical vectors can be objectively analyzed using the numerical values to determine context (e.g., similarity between different text), categorizing text based on numerical bins or ranges, providing sentiment analysis and outputting a sentiment, and the like. Details of how the hypercube encoding and decoding are performed are described in further details below with reference to FIGS. 2-5.

Although the core network 102 has been simplified for ease of explanation in FIG. 1, it should be noted that the core network 102 may include additional components that are not shown. For example, the core network 102 may combine core network components of a cellular network with components of a triple play service network; where triple play services include telephone services, Internet services and television services to subscribers. For example, core network 102 may functionally comprise a fixed mobile convergence (FMC) network, e.g., an IP Multimedia Subsystem (IMS) network. In addition, core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 102 may also further comprise a broadcast television network, e.g., a traditional cable provider network or an Internet Protocol Television (IPTV) network, as well as an Internet Service Provider (ISP) network.

The core network 102 may include network elements that may serve as gateway servers or edge routers to interconnect the core network 102 with other networks (e.g., a home network, the Internet, wireless access networks, other types of access network, and so forth). The core network 102 may also include other types of servers, such as for example, a plurality of television (TV) servers, a plurality of content servers, a plurality of application servers, an advertising server, and the like.

In one embodiment, the endpoint devices 110 and 112 may be part of an access network. Alternatively, the endpoint devices 110 and 112 may be distinct from the access network, but are communicatively coupled to the AS 104 in the core network 102 via the access network. For example, the access network may be a Digital Subscriber Line (DSL) network, a broadband cable access network, a Local Area Network (LAN), a cellular or wireless access network, a 3$^{rd}$ party network, and the like. For example, the operator of core network 102 may provide a cable television service, an IPTV service, or any other type of television service to subscribers via the access network. In this regard, access network may include a node, e.g., a mini-fiber node (MFN), a video-ready access device (VRAD) or the like. However, in another example node may be omitted, e.g., for fiber-to-the-premises (FTTP) installations. The access network may also transmit and receive communications between the endpoint devices 110 and 112 and core network 102 relating to voice telephone calls, communications with web servers, and so forth.

Alternatively, or in addition, the network 100 may provide television services to endpoint devices 110 and 112 via satellite broadcast. For instance, a ground station may receive television content from television servers in the core network 102 for uplink transmission to a satellite. Accordingly, the satellite may receive television content from the ground station and may broadcast the television content to a satellite receiver, e.g., a satellite link terrestrial antenna (including satellite dishes and antennas for downlink communications, or for both downlink and uplink communications), as well as to satellite receivers of other subscribers within a coverage area of the satellite. In one example, the satellite may be controlled and/or operated by a same network service provider as the core network 102. In another example, the satellite may be controlled and/or operated by a different entity and may carry television broadcast signals on behalf of the core network 102.

In one embodiment, the access network of the endpoint devices 110 and 112 may include a home gateway (not shown), which receives data/communication associated with different types of media. The home gateway may transmit data to various endpoint devices connected to the home gateway in the access network of the endpoint devices 110 and 112 The endpoint devices 110 and 112 may then receive the data from the core network 102 via the home gateway.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 102 is not limited to an IMS network. Similarly, the present disclosure is not limited to an IP/MPLS network for VoIP telephony services, or any particular type of broadcast television network for providing television services, and so forth.

As discussed above, the present disclosure provides hypercube encoding and decoding of text into numerical values, or a vector of numerical values. In one embodiment, text may include a series of alphanumeric characters and/or symbols. The alphanumeric characters may be any language. For example, the alphanumeric characters and/or symbols may be English, Spanish, Korean, Latin, Chinese, and the like. Using English only as an example, text may include letters (e.g., the letters A-Z), numbers (e.g., 0-9), and/or symbols (e.g., !, @, #, $, %, and the like). In an example, the alphanumeric characters may include all 128 characters of American Standard Code for Information Interchange (ASCII), all 256 characters of extended ASCII call 256 characters, and the like.

The text may include a string of characters. Some strings of characters may be arranged as a word or a plurality of words that form a sentence. A word may be a sequence of characters that convey a meaning when read. A sentence may be a sequence of words that form a prose that can also convey a meaning when read. For example, using ASCII characters as an example, the word "DOG" may include characters D, O, and G, or the phrase "#trending" may include the characters #, T, R, E, N, D, I, N, and G. A plurality of words may include a sentence such as "my dog is cute." The words may be separated by spaces between the words "my" and "dog," "dog" and "is," and "is" and "cute." Sentences may have spaces removed for hypercube encoding. Thus, the sentence "my dog is cute" may be processed to form text "mydogiscute" that includes characters M, Y, D, O, G, I, S, C, U, T, and E. The text "mydogiscute" may then be processed with the hypercube encoding.

In one embodiment, the hypercube encoding may convert the text into a numerical vector. The numerical vector may be comprised of a number of values. The number of values included in the vector may be based on a number of coordinates that are used to identify a vertex on a hypercube plus one additional value to represent the number of characters in the text.

The number of coordinates that are used may be based on a size or dimensions of the hypercube. The dimensions of the hypercube may be selected based on a number of characters that are included in the text that is to be encoded. The dimension for the hypercube should be selected such that the number of vertices of the hypercube is equal to or greater than the number of characters of the text that is to be encoded. For example, if the text is to be represented by the 256 different characters found in extended ASCII characters, then the dimensions of the hypercube may be selected such that there are 256 vertices. Thus, there may be one vertex to uniquely represent each one of the 256 different characters included in the extended ASCII characters. Similarly, if the text is to be represented by 128 different characters found in ASCII characters, then the dimensions of the hypercube may be selected such that there are 128 vertices. Thus, there may be one vertex to uniquely represent each one of the 128 different characters included in the ASCII characters.

In one embodiment, a hypercube may be defined as an n-dimensional analogue of a square (n=2). A hypercube may be a closed, compact, convex geometric figure whose 1-skelton consists of groups of opposite parallel line segments aligned in each of the space's dimensions. Each of the line segments may be perpendicular to each other and of the same length. An n-dimensional hypercube may also be referred to as an n-cube or an n-dimensional cube.

The hypercube may also be regarded as a convex hull of all sign permutations of the coordinates. For example, each vertex of the hypercube may be represented by a series of positive ones or negative ones (+1 or −1). The number of ones used for each vertex may be dependent on the dimension of the hypercube. In other words, the number of vertices in a hypercube may be a function of the dimension that is selected. The number of vertices may be equal to $2^n$ where n is equal to the number of dimensions.

To illustrate, a one dimensional hypercube (e.g., $2^1$) would have each vertex represented by a single +1 or −1 and have two vertices. A two-dimensional hypercube (e.g., $2^2$) would have each vertex represented by two ones (e.g., [+/−1, +/−1]) and have four vertices. An 8-dimensional hypercube (e.g., $2^8$) would have each vertex represented by eight ones (e.g., [+/−1, +/−1, +/−1, +/−1, +/−1, +/−1, +/−1, +/−1,]) and have 256 vertices, and so forth. Thus, for an 8-dimensional hypercube, the numerical vector may include nine (9) numerical values. The first eight numerical values may be obtained by processing the vertex coordinates of each character in the text, as described below, and the ninth numerical value may represent the number of characters in the text.

Figure 2:
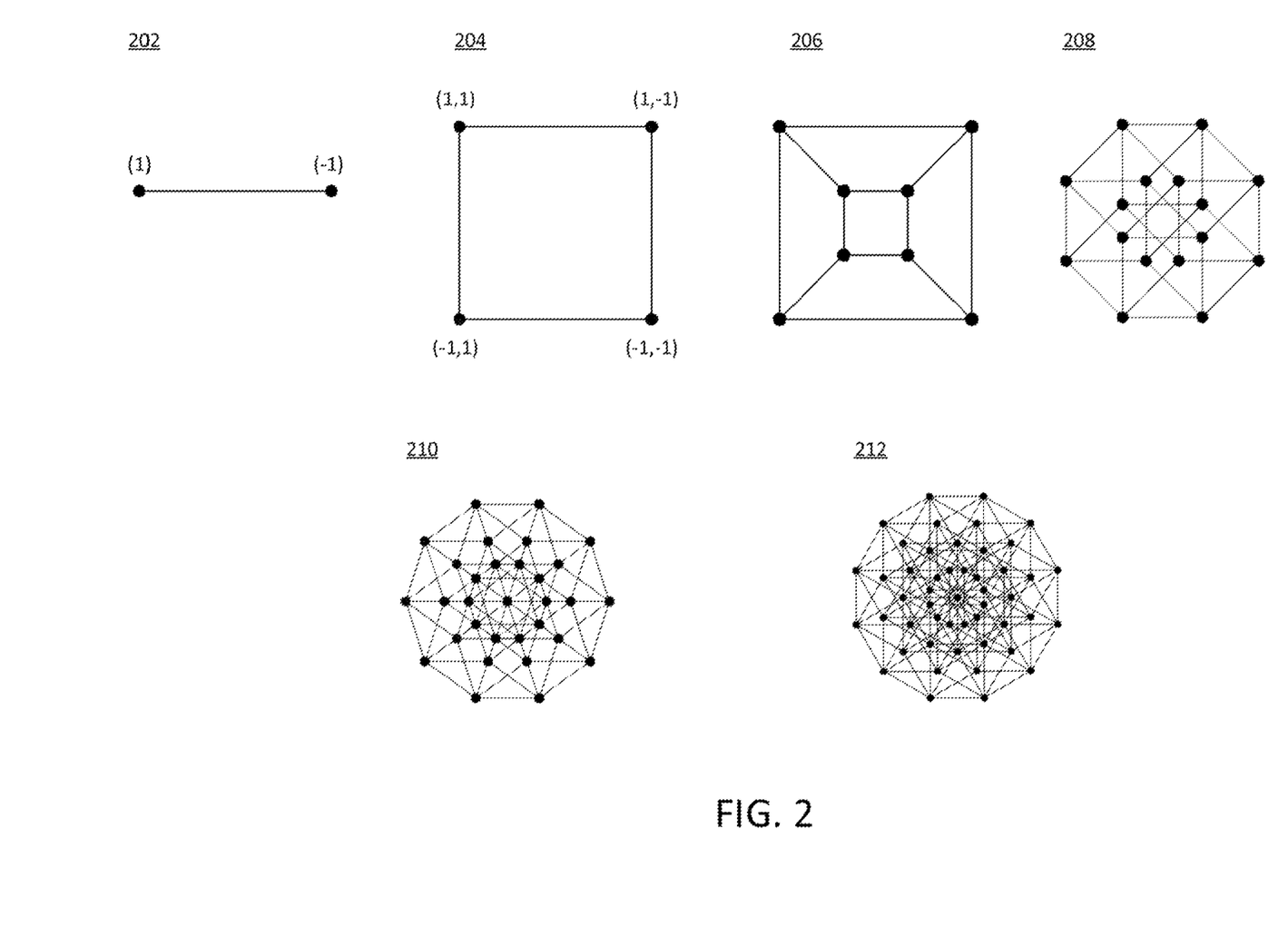
FIG. 2 illustrates example hypercubes of that can be used to encode text of the present disclosure.

FIG. 2 illustrates examples of hypercubes that can be used to encode text of the present disclosure. FIG. 2 illustrates example hypercubes 202, 204, 206, 208, 210, and 212. The hypercube 202 illustrates a one-dimensional hypercube. As described above, the hypercube 202 may have two vertices that are represented by a single 1 and labeled as [+1] and [−1]. The hypercube 204 illustrates a two-dimensional hypercube. As described above, the hypercube 204 may have four vertices that are represented by two 1's and labeled as [1, 1], [1, −1], [−1, 1], and [−1, −1].

The hypercubes 206, 208, 210 and 212 may have their vertices similarly labeled. For example, the hypercube 206 may be a 3-dimensional hypercube with eight vertices. Each one of the eight vertices may be represented by three 1's (e.g., [+/−1, +/−1, +/−1]). The hypercube 208 may be a 4-dimensional hypercube with 16 vertices. Each one of the 16 vertices may be represented by four 1's (e.g., [+/−1, +/−1, +/−1, +/−1]). The hypercube 210 may be a 5-dimensional hypercube with 32 vertices. Each one of the 32 vertices may be represented by five 1's (e.g., [+/−1, +/−1, +/−1, +/−1, +/−1]). The hypercube 212 may be a 6-dimensional hypercube with 64 vertices. Each one of the 64 vertices may be represented by six 1's (e.g., [+/−1, +/−1, +/−1, +/−1, +/−1, +/−1]), and so on.

In one embodiment, the text may be encoded using the hypercube with the selected n-dimensions using Equation (1) below:

$$P_i = \Phi(i)P_{i-1} + \theta(i)H(S_i), i \in \{1,2,\ldots n\}, P_0 = m \cdot [0], \quad \text{Equation (1):}$$

where S represents the text being encoded, $P_i$ is the point integer vector at a current character position of text S, i represents the ith character of the text S, n is the number of characters in the text S, m is the number of dimensions of the hypercube, $\theta(i)$ is a controller function, $\theta(i)$ is an activation function of the position i, and $H(S_i)$ is the hypercube vertex for the i-th character position in the text S.

In one embodiment, the encoding performed by the Equation (1) may be a lossless compression. In other words, the original text can be fully recovered from the encoded numerical vector. In lossless compression, the controller function, $\theta(i)$, may be a constant value of 1. The activation function, $\theta(i)$, may be an exponential function of $2^{i-1}$.

Thus, in an example, for lossless compression, the Equation (1) may be represented as Equation (2) below:

$$P_i = P_{i-1} + 2^{i-1}H(S_i), i \in \{1,2,\ldots n\}, P_0 = m \cdot [0]. \quad \text{Equation (2):}$$

In one embodiment, as noted above, each character may be uniquely represented by a vertex of the hypercube. For example, for an extended ASCII character set with 256 unique characters, an 8-dimensional hypercube with 256 vertices may be selected. In one embodiment, each one of the 256 extended ASCII characters may be assigned to a vertex of the 8-dimensional hypercube. In other words, each extended ASCII character may be assigned an eight value coordinate of positive ones and/or negative ones that represents one of the vertices of the 8-dimensional hypercube.

Figure 3:
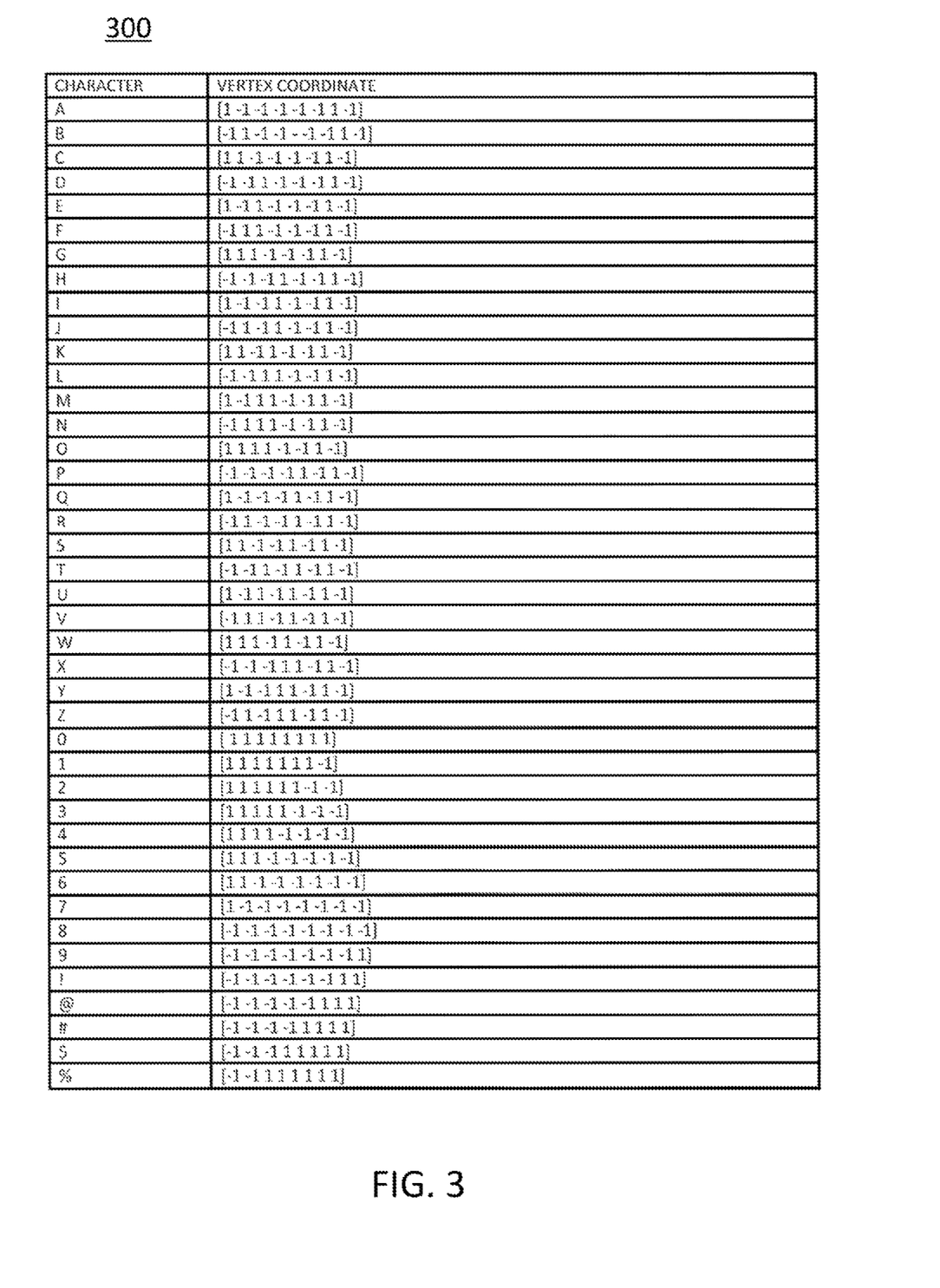
FIG. 3 illustrates an example table of a mapping of alphanumeric characters to vertices of a hypercube.

FIG. 3 illustrates an example table 300 that shows an example of how various characters can be represented by a unique vertex coordinate. The table 300 is based off of an example 8-dimensional hypercube used in the example above. Thus, each character may include a vector with 8 values of +/−1. It should also be noted that the table 300 only lists some (e.g., a subset) of the 256 of the extended ASCII characters. For example, the table 300 includes a mapping of A-Z, 0-9, and symbols, !, @, #, $, and %. However, the remaining characters of the extended ASCII characters may be similarly assigned a unique vertex coordinate of the 8-dimensional hypercube. The table 300 may also be able to assign different vertex coordinates for upper-case and lower-case characters. Thus, the hypercube encoding may be able to differentiate between upper-case and lower-case letters based on the uniquely assigned vertex coordinates between a lower-case letter and an upper-case letter. Thus, based on the number of desired characters to be encoded, the proper n-dimensional hypercube would need to be selected to ensure that it is sufficiently large to encode all of the desired characters.

It should be noted that the vertex coordinates may be randomly assigned to each of the 256 extended ASCII characters, as long as each vertex coordinate is assigned to only one of the 256 extended ASCII characters. In other words, although the character A is assigned the vertex coordinate of [1 −1 −1 −1 −1 −1 1 −1] in table 300 another embodiment may assign the same character A with a different vertex coordinate (e.g., [1 −1 −1 −1 −1 −1 1 −1]) In other words, different processing systems may use different vertex coordinates for the characters, as long as the same vertex coordinate assignments in the table 300 are being used by the encoding hypercube encoder and the decoding hypercube decoder.

It should also be noted that the table 300 may be modified for any characters. For example, characters of another language may be mapped to different vertices of the hypercube. In addition, hypercubes of another dimension may be used for languages that have less characters. For example, a 5-dimensional hypercube may be used for a language that has less than 32 alphanumeric characters and/or symbols. Each character may be represented by a vertex coordinate that includes five values of +/−1, and so forth.

In one embodiment, the table 300 may be stored with the HED 108 in the AS 104, the endpoint device 110 or the endpoint device 112. In one embodiment, the table 300 may be stored in the DB 106.

Referring back to the example of using an 8-dimensional hypercube to represent extended ASCII characters as shown in the table 300, an example of encoding using Equation (2) is shown for the text "MUSIC". As noted, Equation (2) is for lossless compression where there is a one-to-one compression and no data is lost. As a result, the text can be perfectly recovered from the numerical vector that is generated using Equation (2).

According to Equation (2), the numerical vector for the first character i=1 is simply the vertex $H(S_i)$ of the first character M=[1 −1 1 1 −1 −1 1 −1]. According to Equation (2), for the second character U, i=2. Thus, for the numerical coding of MU, would be the previous numerical vector of M (e.g., [1 −1 1 1 −1 −1 1 −1]) plus the activation function $2^{2-1}$, or $2^1$, multiplied by the vertex coordinate of the second character U (e.g., [1 −1 1 −1 1 −1 1 −1] according to the table 300). Thus, the numerical vector of MU may be [1 −1 1 1 −1 −1 1 −1]+2*[1 −1 1 −1 1 −1 1 −1]=[1 −1 1 1 −1 −1 1 −1]+[2 −2 2 −2 2 −2 2 −2]=[3 −3 3 −1 −3 3 −3]. The numerical vector for the text "MU" may be [3 −3 3 −1 −3 3 −3]. The process may be repeated for the rest of the characters S, I, and C, as follows.

The third letter S, i=3, may have a vertex coordinate of [1 1 −1 −1 1 −1 1 −1] according to the table 300. The numerical vector for MUS may be calculated, according to Equation (2), as the previous numerical vector [3 −3 3 −1 −3 3 −3]+$2^{2}$*[1 1 −1 −1 1 −1 1 −1], or [3 −3 3 −1 −3 3 −3]+[4 4 −4 −4 4 −4 4 −4]=[7 1 −1 −5 5 −7 7 −7]. The fourth letter I, i=4, may have a vertex coordinate of [1 −1 −1 1 −1 −1 1 −1] according to the table 300. The numerical vector for MUSIC may be calculated, according to Equation 2, as the previous numerical vector [7 1 −1 −5 5 −7 7 −7]+$2^{3}$*[1 −1 −1 1 −1 −1 1 −1], or [7 1 −1 −5 5 −7 7 −7]+[8 −8 −8 8 −8 −8 8 −8]=[15 −7 −9 3 −3 −15 15 −15]. The fifth letter C, i=5, may have a vertex coordinate of [1 1 −1 −1 −1 −1 1 −1]

according to the table 300. The numerical vector for MUSIC may be calculated, according to Equation 2, as the previous numerical vector [15 −7 −9 3 −3 −15 15 −15]+$2^{4}$*[1 1 −1 −1 −1 −1 1 −1], or [15 −7 −93 −3 −15 15 −15]+[16 16 −16 −16 −16 −16 16 −16]=[31 9 −25 −13 −19 −31 31 −31]. Since there are no more characters, the encoding may be completed and the text "MUSIC" may be encoded to generate the numerical vector [31 9 −25 −13 −19 −31 31 −31].

In one embodiment, the final numerical vector may include an additional numerical value to represent the total number of characters in the text. Thus, the final numerical vector for the text "MUSIC" may be represented by the numerical vector [31 9 −25 −13 −19 −31 31 −31 5].

A second example below shows a step-by-step encoding of the text "COMPUTER" using the vertex coordinate assignments as shown in table 300. The encoding may be as follows:

C=[1 1 −1 −1 −1 −1 1 −1]
CO=[1 1 −1 −1 −1 −1 1 −1]+$2^{1}$ [1 1 1 1 −1 −1 1 −1]=[3 3 1 1 −3 −3 3 −3]
COM=[3 3 1 1 −3 −3 3 −3]+$2^{2}$ [1 −1 1 1 −1 −1 1 −1]=[7 −1 5 5 −7 −7 7 −7]
COMP=[7 −1 5 5 −7 −77 −7]+$2^{3}$ [−1 −1 −1 −1 1 −1 1 −1]=[−1 −9 −3 −3 1 −15 15 −15]
COMPU=[−1 −9 −3 −3 1 −15 15 −15]+$2^{4}$ [1 −1 1 −1 1 −1 1 −1]=[15 −25 13 −19 17 −31 31 −31]
COMPUT=[15 −25 13 −19 17 −31 31 −31]+$2^{5}$ [−1 −1 1 −1 1 −1 1 −1]=[−17 −57 −45 −51 49 −63 63 −63]
COMPUTE=[−17 −57 −45 −51 49 −63 63 −63]+$2^{6}$ [1 −1 1 −1 −1 −1 1 −1]=[47 −121 109 −115 −15 −127 127 −127]
COMPUTER=[47 −121 109 −115 −15 −127 127 −127]+$2^{7}$ [−1 1 −1 −1 1 −1 1 −1]=[−81 7 −19 −243 113 −255 255 −255]

Appending the number of characters of the text, the final numerical vector for the text "COMPUTER" is [−81 7 −19 −243 113 −255 255 −255 8].

A third example illustrates a step-by-step encoding of the text "MY DOG IS CUTE." The text in this third example is a sentence comprising a plurality of words separated by spaces. The hypercube encode may remove any spaces before encoding a sentence. Thus, the text "MY DOG IS CUTE" may be processed to be "MYDOGISCUTE" before encoding. The encoding of "MYDOGISCUTE" may be performed similar to the two examples above. The vertex coordinates may be obtained from table 300 for each character. The numerical vectors for each combination of characters calculated using Equation (2) would be as follows:

M=[1 −1 1 1 −1 −1 1 −1]
MY=[3 3 −1 3 1 −3 3 −3]
MYD=[−1 −7 3 −1 −3 −7 7 −7]
MYDO=[7 1 11 7 −11 −15 15 −15]
MYDOG=[23 17 27 −9 −27 −31 31 −31]
MYDOGI=[55 −15 −5 23 −59 −63 63 −63]
MYDOGIS=[119 49 −69 −41 5 −127 127 −127]
MYDOGISC=[247 177 −197 −169 −123 −255 255 −255]
MYDOGISCU=[503 −79 59 −425 133 −511 511 −51 1]
MYDOGISCUT=[−9 −591 571 −937 645 −1023 1023 −1023]
MYDOGISCUTE=[1015 −1615 1595 −1961 −379 −2047 2047 −2047]

Appending the number of characters of the text, the final numerical vector for the text "MYDOGISCUTE" is [1015 −1615 1595 −1961 −379 −2047 2047 −2047 11].

The numerical vectors may then be stored, analyzed, or processed for various different applications, as described above. For example, the numerical vector may consume less memory to store than the entire text in ASCII format. For example all text, no matter how long may be compressed in the above example into a 9 value vector. The smaller size of the numerical vector may also consume less bandwidth when being transmitted over the network 100.

In one embodiment, the numerical vectors may allow applications to efficiently and objectively analyze text. For example, the numerical vector of the text "MYDOGIS-CUTE" and "MYCATISCUTE" may be compared to determine that there is similar context or meaning. The context may be determined by comparing the values of each point or position of the numerical vector. For example, the text "MYDOGISCUTE" and "MYCATISCUTE" may have similar values or values within a threshold that is the first position, the second position, and sixth through $11^{th}$ positions. An analysis may be determined that when a number of identical positions have the same value or values within the threshold, the text may be considered to have similar context. A similar analysis may be applied to quickly and efficiently group text into different categories, detect a sentiment from the text, and the like.

In one embodiment, the numerical vector may also be decoded to convert the numerical vector into the original text. The decoding may be performed based on the total number of characters found in the last position of the numerical vector, the sign of each value of the numerical vector not including the last value, and solving for the previous numerical vector according to Equation (2) until all characters are identified. The decoding may decode beginning with the last character and continuing to process from the last character to the first character. The decoding process may know that all the characters are decoded based on the last value of the numerical vector that indicates a total number of characters in the text.

An example of decoding is performed using the numerical vector of "MUSIC" that was calculated above. For example, the final numerical vector of the test "MUSIC" was encoded to be [31 9 −25 −13 −19 −31 31 −31 5]. The numerical vector indicates that the original text includes 5 characters (e.g., the last value of "5" indicates that this numerical vector represents a 5-character text). The sign of each value in the numerical vector except the last value (e.g., 31 9 −25 −13 −19 −31 31 and −31) would be positive, positive, negative, negative, negative, negative, positive, and negative. The signs may be representative of the positive 1 or negative 1 of the vertex coordinate in the last character. Thus, the last character (e.g., the fifth character) would have a vertex coordinate of [1 1 −1 −1 −1 −1 1 −1]. Using the table 300, the hypercube decoder may determine that the character with the vertex coordinate of [1 1 −1 −1 −1 −1 1 −1] is character "C."

Then, using Equation (2), the previous numerical vector for text "XXXX" may be calculated (e.g., XXXX represents the known number of characters remaining, but the fact that the identity of those characters is still unknown). Thus, [31 9 −25 −13 −19 −31 31 −31]=$P_{i-1}$+$2^4$*[1 1 −1 −1 −1 −1 1 −1]. Solving for $P_{i-1}$ would result in $P_{i-1}$=[15 −7 −93 −3 −15 15 −15].

Pulling the signs from the numerical value [15 −7 −9 3 −3 −15 15 −15] would result in positive, negative, negative, positive, negative, negative, positive, and negative. Thus, the vertex coordinates of the fourth character may be [1 −1 −1 1 −1 −1 1 −1]. Using the table 300, the character with the vertex coordinate [1 −1 −1 1 −1 −1 1 −1] is determined to be "I". Using Equation (2), the previous numerical vector for text "XXX" may be calculated. Thus, [15 −7 −9 3 −3 −15 15 −15]=$P_{i-2}$+$2^3$*[1 −1 −1 1 −1 −1 1 −1]. Solving for $P_{i-1}$ would result in $P_{i-1}$=[7 1 −1 −5 5 −7 7 −7].

Pulling the signs from the numerical value [7 1 −1 −5 5 −7 7 −7] would result in positive, positive, negative, negative, positive, negative, positive, and negative. Thus, the vertex coordinates of the third character may be [1 1 −1 −1 1 −1 1 −1]. Using the table 300, the character with the vertex coordinate [1 1 −1 −1 1 −1 1 −1] is determined to be "S." Using Equation (2), the previous numerical vector for text "XX" may be calculated. Thus, [7 1 −1 −5 5 −7 7 −7]=$P_{i-2}$+$2^2$*[1 1 −1 −1 1 −1 1 −1]. Solving for $P_{i-1}$ would result in $P_{i-1}$=[3 −3 3 −1 1 −3 3 −3].

Pulling the signs from the numerical value [3 −3 3 −1 1 −3 3 −3] would result in positive, negative, positive, negative, positive, negative, positive, and negative. Thus, the vertex coordinates of the second character may be [1 −1 1 −1 1 −1 1 −1]. Using the table 300, the character with the vertex coordinate [1 −1 1 −1 1 −1 1 −1] is determined to be "U." Using Equation (2), the previous numerical vector for text "X" may be calculated. Thus, [3 −3 3 −1 1 −3 3 −3]=$P_{i-2}$+$2^1$*[1 −1 1 −1 1 −1 1 −1]. Solving for $P_{i-1}$ would result in $P_{i-1}$=[1 −1 1 1 −1 −1 1 −1]. The first character of the text having a vertex coordinate of [1 −1 1 1 −1 −1 1 −1] may be M. Since the total number of characters was five as indicated in the numerical vector and five characters are identified, the decoding is completed. Therefore, the text "MUSIC" can be fully recovered from the numerical vector. Using the example above, the numerical vectors for "COMPUTER" and "MYDOGISCUTE" may be similarly decoded.

Thus, text may be encoded using an n-dimensional hypercube, an assignment of vertex coordinates to characters used in the text, and Equation (1) or Equation (2) for lossless compression, as described above. The hypercube encoding and decoding provide an efficient method for converting text into numerical form that can be easily processed and analyzed by processors for various different applications such as natural language processing, sentiment analysis, context analysis, and the like.

Figure 4:
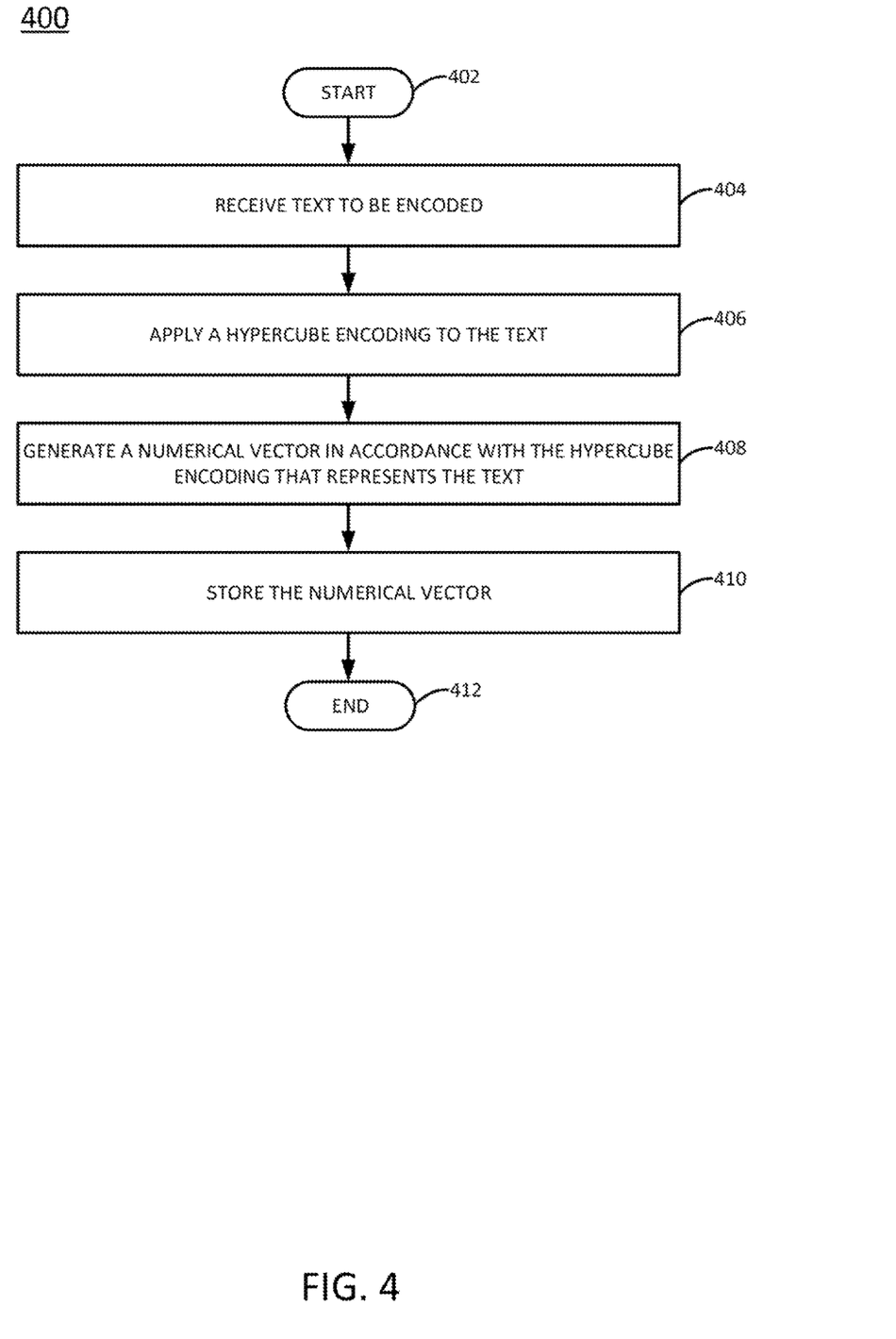
FIG. 4 illustrates a flowchart of an example method for hypercube encoding of text, in accordance with the present disclosure.

FIG. 4 illustrates a flowchart of an example method 400 for hypercube encoding of text, in accordance with the present disclosure. In one example, steps, functions and/or operations of the method 400 may be performed by a device as illustrated in FIG. 1, e.g., AS 104, the endpoint 110 or the endpoint 112. In one example, the steps, functions, or operations of method 400 may be performed by a computing device or system 600, and/or a processing system 602 as described in connection with FIG. 6 below. For instance, the computing device 600 may represent at least a portion of the AS 104 in accordance with the present disclosure. For illustrative purposes, the method 400 is described in greater detail below in connection with an example performed by a processing system, such as processing system 602.

The method 400 begins in step 402 and proceeds to step 404. In step 404, the processing system may receive text to be encoded. In one embodiment, the text may be a series of alphanumeric characters and/or symbols. The text may be a word or a sentence that includes a plurality of words separated by spaces. The text may be in any desired language. The text may be received from any number of computerized systems, e.g., an interactive voice response (IVR) system, a voice recording system, a customer care system, a texting system, an email system, a social media platform (e.g., postings from a social media platform), a blogging platform, a voice to text system, a sentiment detection system, a text library, and so on. An optional voice to text mechanism can be employed to convert any audio signals into a text form, e.g., a text or a string of alphanumeric characters.

In step 406, the processing system may apply and/or select a hypercube encoding to the text. In one embodiment, the hypercube encoding that is used may be based on an n-dimensional hypercube. The dimensions of the hypercube may be dependent on the number of unique characters that can be used for the text or for a given language of the text.

For example only, for English text an example standard may be ASCII or extended ASCII. ASCII may include 128 unique characters, thus 128 different vertices may be mapped to the 128 different ASCII characters. As a result, to obtain 128 vertices, a 7-dimensional hypercube may be selected (e.g., $2^7=128$).

In one embodiment, each vertex coordinate may be represented by a vector of 7 values of positive 1 and/or negative 1. Each vertex coordinate may be associated with one character of the ASCII characters. Thus, each one of the 128 ASCII characters may be assigned to a unique vertex coordinate of the hypercube. The assigned vertex coordinates may be arranged into a table (e.g., the example table 300 illustrated in FIG. 3) and stored as part of the hypercube encoder and decoder.

Then, for lossless compression, using the Equation (2) described above, the text may be encoded. The text may be encoded one letter at a time using the Equation (2) until the numerical vector is generated to represent all of the characters in the text. Examples of the encoding are described above using example text such as "MUSIC," "COMPUTER," and "MYDOGISCUTE."

In step 408, the processing system may generate a numerical vector in accordance with the hypercube encoding that represents the text. In one embodiment, the numerical vector may also include a total number of characters in the text. For example, the last value of the numerical vector may represent the total number of characters in the text. The total number of characters in the numerical vector may be used to successfully decode the numerical vector back into the original text.

Thus, the total number of values in the numerical vector may equal the number of dimensions of the hypercube plus one. Using the seven dimensional hypercube example above, the numerical vector may include 8 total values (e.g., 7 values associated with the vertex coordinate and one additional value to represent the total number of characters in a text).

In step 410, the processing system may store the numerical vector into a storage device, e.g., a database on an application server, in a memory device (e.g., a volatile or non-volatile memory device), and so on. The numerical vector may reduce the amount of memory consumed compared to storing the actual text. For example, all text regardless of the number of characters included into the text may be reduced to a numerical vector having a size based on the dimensions of the hypercube used to encode the numerical vector.

In one embodiment, the numerical vector may also be transmitted to another endpoint device for decoding via a hypercube decoding, as described below and shown in FIG. 5. The transmission of the numerical vector may also reduce the bandwidth that is consumed during transmission.

In one embodiment, the numerical vector may be provided to a machine learning model to execute context analysis of the numerical vector with other numerical vectors. In one embodiment, machine learning algorithms may be executed by a machine learning model (MLM) (or machine learning (ML)-based model). In one embodiment, the MLM or ML may comprise the one or more machine learning algorithms that have been "trained" or configured in accordance with input data (e.g., training data) to perform a particular service, e.g., to detect context, to perform sentiment analysis, to categorize the text based on the numerical vectors, and so forth. Examples of the present disclosure are not limited to any particular type of MLA/model, but are broadly applicable to various types of MLAs/models that utilize training data, such as support vector machines (SVMs), e.g., linear or non-linear binary classifiers, multi-class classifiers, deep learning algorithms/models, such as deep neural networks (DNNs), decision tree algorithms/models, k-nearest neighbor (KNN) clustering algorithms/models, hidden Markov models (HMMs), conditional random fields (CRF) models, generative adversarial networks (GANs), and so forth.

The output of the machine learning model may be provided to an application to perform an action based on the output. For example, advertisements may be sent to a user based on the detected sentiment of the text, customer service representatives may proactively reach out to a customer based on the detected sentiment of the text submitted to a customer care system, certain actions may be triggered when a number of texts in a particular category exceeds a threshold, and so forth. The method 400 may end in step 412.

Figure 5:
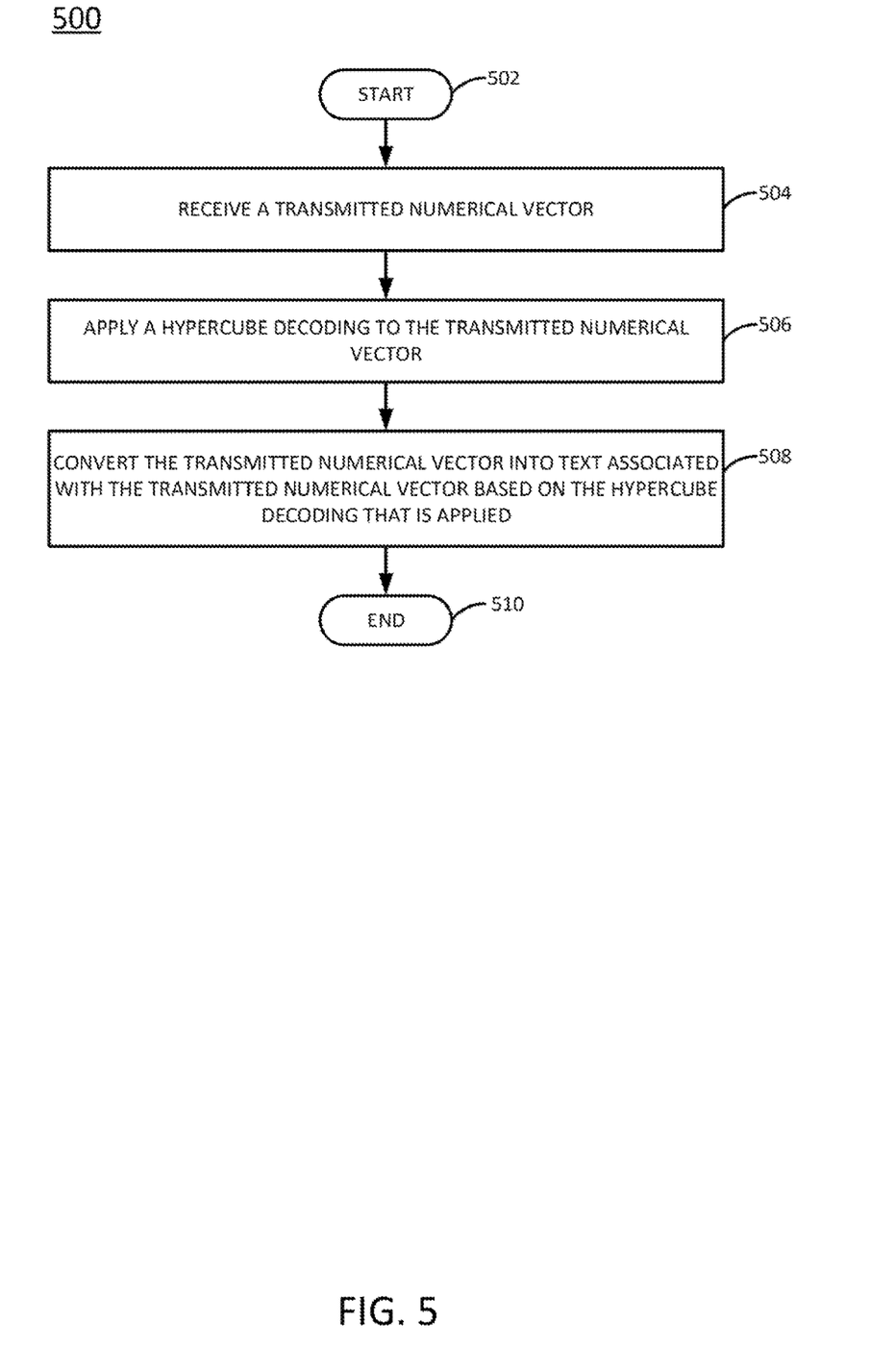
FIG. 5 illustrates a flowchart of an example method for hypercube decoding of a hypercube text vector, in accordance with the present disclosure.

FIG. 5 illustrates a flowchart of an example method 500 for hypercube decoding of text, in accordance with the present disclosure. In one example, steps, functions and/or operations of the method 500 may be performed by a device as illustrated in FIG. 1, e.g., AS 104, the endpoint 110 or the endpoint 112. In one example, the steps, functions, or operations of method 500 may be performed by a computing device or system 600, and/or a processing system 602 as described in connection with FIG. 6 below. For instance, the computing device 600 may represent at least a portion of the AS 104 in accordance with the present disclosure. For illustrative purposes, the method 500 is described in greater detail below in connection with an example performed by a processing system, such as processing system 602.

The method 500 begins in step 502 and proceeds to step 504. In step 504, the processing system may receive a transmitted numerical vector. As noted above, the generated numerical vector may be transmitted to an endpoint for decoding. The transmitted numerical vector may include a value that indicates a vertex coordinate and a total number of characters in the original text associated with the transmitted numerical vector. In other words, the transmitted numerical vector may be part of a transmitted communications between two entities (e.g., between two endpoint devices, between a user endpoint device and a network server, and so on). Alternatively, method 500 can also be employed to decode a stored encoded numerical vector retrieved from a storage device.

In step 506, the processing system may apply a hypercube decoding to the transmitted numerical vector that is received. The hypercube decoding may use the same dimensions as the dimensions of the hypercube that were selected for the encoding process performed in the method 400. In addition, the same table that maps the characters to unique vertex coordinates used for the encoding in the method 400 may also be used for the hypercube decoding. In other words, the hypercube encoding and the hypercube decoding may use the same n-dimensional hypercube and the same mapping of characters to vertex coordinates of the n-dimensional hypercube.

In one embodiment, the hypercube decoding may begin decoding with the last character of the text. In other words, for languages such as English that write from left to right, the hypercube decoding may decode the text from right to left. Similarly, for other languages that may write from top to bottom, the hypercube decoding may decode the text from the bottom to the top and so on.

Using the example numerical vector of [31 9 −25 −13 −19 −31 31 −31 5] in an 8-dimensional hypercube for extended ASCII characters that represent the text "MUSIC" as described above, the hypercube decoding may determine that there are 5 characters in the text. The hypercube decoding may extract the last character as 'C' based on the signs of the numerical vector, the ASCII character, and hypercube vertex mapping. The numerical vector in the hypercube decoding excludes the last value that represents the total number of characters.

Using the vertex coordinates of the last character, the numerical vector excluding the last value, and Equation (2) above, the numerical vector for the previous combination of characters may be calculated. The process may be repeated for each character, as described above, to decode the remaining characters I, S, U, and M. The decoding steps may be repeated for a number of times equal to the last value in the numerical vector. As noted above, the last value may represent a total number of characters in the original text that was encoded.

In step 508, the processing system may convert the transmitted numerical vector into text associated with the transmitted numerical vector based on the hypercube decoding that is applied. After the numerical vector is decoded, the characters of the original text may be obtained. The characters may be arranged in order to generate the original text. For example, working backwards, the hypercube decoding extracted the characters C, I, S, U, and M. Rearranging the characters into the proper order, the transmitted numerical vector may be converted into the text "MUSIC." The decoded text can then be stored in a storage device and/or transmitted to any number of computerized systems as noted above. Furthermore, the decoded text can be presented on a display of an endpoint device (e.g., a smart phone) in a communication embodiment or use case. The method 500 may end in step 510.

It should be noted that the methods 400 and 500 may be expanded to include additional steps or may be modified to include additional operations with respect to the steps outlined above. In addition, although not specifically specified, one or more steps, functions, or operations of the methods 400 and 500 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIGS. 4 and 5 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

Figure 6:
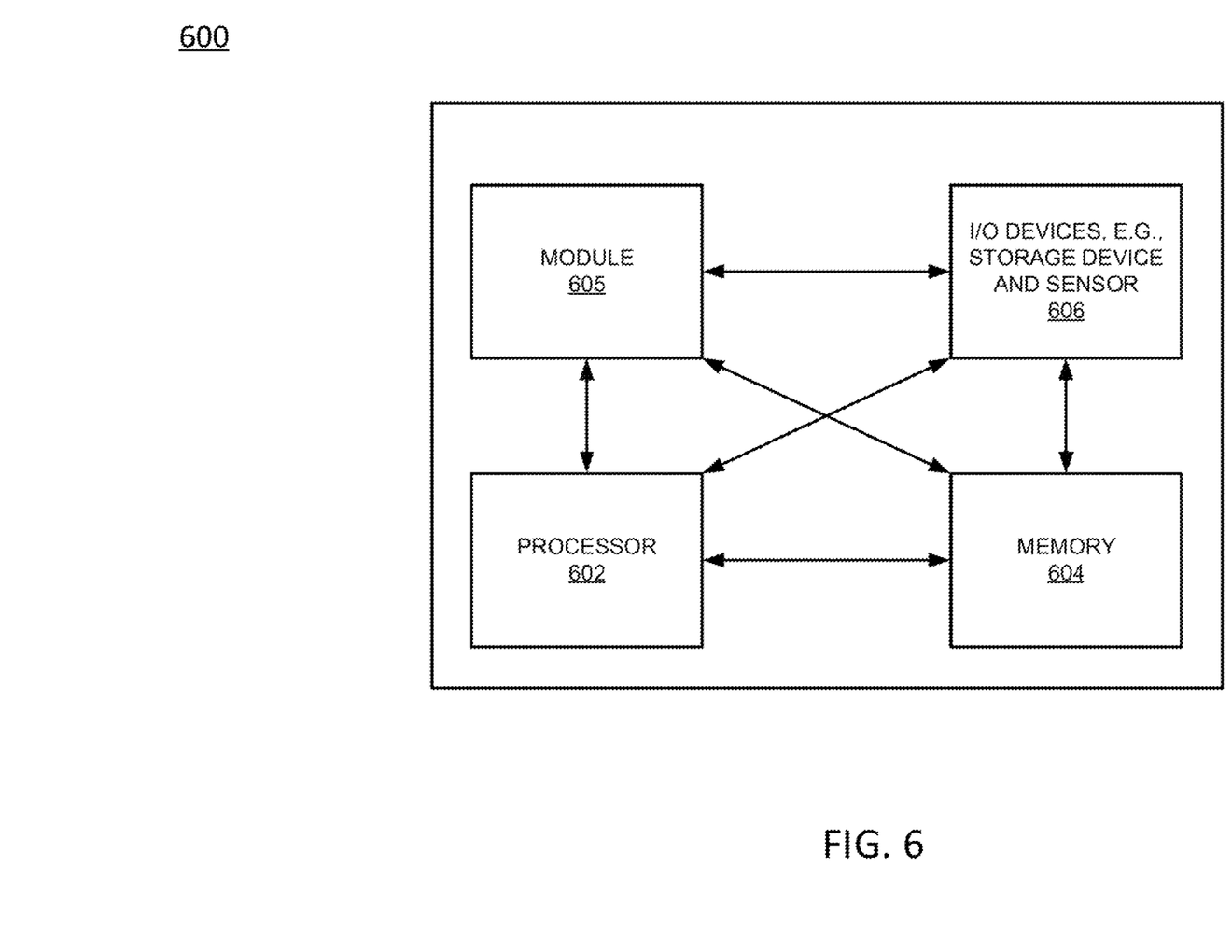
FIG. 6 depicts a high-level block diagram of a computing device or processing system specifically programmed to perform the functions described herein.

FIG. 6 depicts a high-level block diagram of a computing device or processing system specifically programmed to perform the functions described herein. As depicted in FIG. 6, the processing system 600 comprises one or more hardware processor elements 602 (e.g., a central processing unit (CPU), a microprocessor, or a multi-core processor), a memory 604 (e.g., random access memory (RAM) and/or read only memory (ROM)), a module 605 for hypercube encoding and/or decoding of text, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 400 or 500 as discussed above is implemented in a distributed or parallel manner for a particular illustrative example, i.e., the steps of the above methods 400 or 500, or the entire method 400 or 500 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 602 can also be configured or programmed to cause other devices to perform one or more operations as discussed above. In other words, the hardware processor 602 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 400 or 500. In one example, instructions and data for the present module or process 605 for hypercube encoding and/or decoding of text (e.g., a software program comprising computer-executable instructions) can be loaded into memory 604 and executed by hardware processor element 602 to implement the steps, functions, or operations as discussed above in connection with the illustrative methods 400 and 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 605 for hypercube encoding and/or decoding of text (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   receiving, by a processing system comprising at least one processor, text comprising a plurality of alphanumeric characters or symbols, wherein the text consumes a first amount of space in a memory of a computing device of which the processing system is a part; and
   executing, by the processing system, a hypercube encoder/decoder to compress the text into a numerical vector comprising a plurality of numerical values, wherein the hypercube encoder/decoder maps each alphanumeric character or symbol of the text to a vertex coordinate of one of a plurality of vertices of a hypercube, wherein a number of the plurality of vertices is equal to or greater than a number of the plurality of alphanumeric characters or symbols but is fewer than a number of dimensions of the hypercube, wherein a total number of characters in the numerical vector is equal to the number of dimensions of the hypercube plus one additional value such that the numerical vector consumes a second amount of space in the memory that is less than the first amount of space.

2. The method of claim 1, wherein the plurality of alphanumeric characters or symbols is a set of alphanumeric characters of a language.

3. The method of claim 1, wherein the one additional value represents a total number of the plurality of alphanumeric characters or symbols.

4. The method of claim 1, wherein the plurality of alphanumeric characters or symbols comprises american standard code for information interchange characters or extended american standard code for information interchange characters.

5. The method of claim 4, wherein the number of dimensions of the hypercube is eight, and the number of the plurality of vertices is 256 to represent each character of the extended american standard code for information interchange characters.

6. The method of claim 1, wherein the vertex coordinate of each vertex of the plurality of vertices on the hypercube is represented as a sequence of ones, with each one in the sequence of the ones having a positive sign or a negative sign.

7. The method of claim 6, wherein a compression of the text by the hypercube encoder/decoder comprises a lossless compression.

8. The method of claim 7, wherein the executing comprises:
   executing, by the processing system, the hypercube encoder/decoder to add a vertex coordinate of a subsequent character of the plurality of alphanumeric characters or symbols multiplied by an activation function to a vertex coordinate of a previous character of the plurality of alphanumeric characters or symbols to generate a current numerical vector; and
   executing, by the processing system, the hypercube encoder/decoder to repeat the adding until a vertex coordinate of a last character of the plurality of alphanumeric characters or symbols is encoded to generate a part of the numerical vector.

9. The method of claim 8, wherein the activation function comprises a power of two.

10. The method of claim 9, wherein an exponent of the power of two is equal to an i−1th character that is being encoded from 1 to i.

11. The method of claim 1, further comprising:
    transmitting, by the processing system, the numerical vector to an endpoint for decoding via a hypercube decoding.

12. The method of claim 1, further comprising:
    providing, by the processing system, the numerical vector to a machine learning model to execute a context analysis of the numerical vector with other numerical vectors.

13. The method of claim 12, wherein the context analysis is to detect a sentiment from the text associated with the numerical vector and other text associated with the other numerical vectors.

14. The method of claim 12, wherein the context analysis comprises comparing numerical values at different positions within the numerical vector to numerical values at corresponding positions in another numerical vector, wherein the text of the numerical vector is considered to have a similar context to text of the another numerical vector when a number of corresponding positions in the numerical vector and the another numerical vector have values within a threshold of each other, and wherein an amount of time consumed by the context analysis of the numerical vector is less than an amount of time consumed by the context analysis of the text.

15. The method of claim 1, further comprising:
    retrieving, by the processing system, a stored numerical vector; and
    executing, by the processing system, the hypercube encoder/decoder to decompress the stored numerical vector that is retrieved into a decoded text.

16. The method of claim 15, wherein the executing is performed a number of times in accordance with a last value of the stored numerical vector, wherein the last value represents a total number of characters in the decoded text.

17. The method of claim 1, wherein an amount of bandwidth consumed to transmit the numerical vector is smaller than an amount of bandwidth consumed to transmit the text.

18. The method of claim 1, wherein the number of the plurality of vertices is equal to two raised to a power that is equal to the number of dimensions of the hypercube.

19. A non-transitory computer-readable medium storing instructions which, when executed by a processing system including at least one processor, cause the processing system to perform operations, the operations comprising:
    receiving text comprising a plurality of alphanumeric characters or symbols, wherein the text consumes a first amount of space in a memory of a computing device of which the processing system is a part; and
    executing a hypercube encoder/decoder to compress the text into a numerical vector comprising a plurality of numerical values, wherein the hypercube encoder/decoder maps each alphanumeric character or symbol of the text to a vertex coordinate of one of a plurality of vertices of a hypercube, wherein a number of the plurality of vertices is equal to or greater than a number of the plurality of alphanumeric characters or symbols but is fewer than a number of dimensions of the hypercube, wherein a total number of characters in the numerical vector is equal to the number of dimensions of the hypercube plus one additional value such that the numerical vector consumes a second amount of space in the memory that is less than the first amount of space.

20. A device comprising:

a processing system including at least one processor; and a non-transitory computer-readable medium storing instructions which, when executed by the processing system, cause the processing system to perform operations, the operations comprising:

receiving text comprising a plurality of alphanumeric characters or symbols, wherein the text consumes a first amount of space in a memory of the device; and executing a hypercube encoder/decoder to compress the text into a numerical vector comprising a plurality of numerical values, wherein the hypercube encoder/decoder maps each alphanumeric character or symbol of the text to a vertex coordinate of one of a plurality of vertices of a hypercube, wherein a number of the plurality of vertices is equal to or greater than a number of the plurality of alphanumeric characters or symbols but is fewer than a number of dimensions of the hypercube, wherein a total number of characters in the numerical vector is equal to the number of dimensions of the hypercube plus one additional value such that the numerical vector consumes a second amount of space in the memory that is less than the first amount of space.

\* \* \* \* \*